United States Patent
Lemay et al.

(10) Patent No.: US 12,168,520 B2
(45) Date of Patent: Dec. 17, 2024

(54) SYSTEM AND METHOD FOR BALANCING AT LEAST ONE PARAMETER TO BE BALANCED OF AN ELECTRIC MOTOR OF A PROPULSION SYSTEM

(71) Applicant: SAFRAN HELICOPTER ENGINES, Bordes (FR)

(72) Inventors: David Lemay, Moissy-Cramayel (FR); Jean-Philippe Jacques Marin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 257 days.

(21) Appl. No.: 17/778,148

(22) PCT Filed: Dec. 9, 2020

(86) PCT No.: PCT/FR2020/052361
§ 371 (c)(1),
(2) Date: May 19, 2022

(87) PCT Pub. No.: WO2021/116606
PCT Pub. Date: Jun. 17, 2021

(65) Prior Publication Data
US 2022/0411091 A1    Dec. 29, 2022

(30) Foreign Application Priority Data
Dec. 9, 2019  (FR) ...................................... 1913963

(51) Int. Cl.
*H02P 1/16* (2006.01)
*B64D 31/12* (2006.01)
(Continued)

(52) U.S. Cl.
CPC ............. *B64D 31/12* (2013.01); *B64D 31/16* (2024.01); *H02P 5/50* (2013.01); *H02P 5/74* (2013.01)

(58) Field of Classification Search
CPC ........... B64D 31/12; B64D 31/16; H02P 5/50; H02P 5/74; H02P 2101/30; H02P 4/00
See application file for complete search history.

(56) References Cited

U.S. PATENT DOCUMENTS

2013/0231208 A1    9/2013  Buono et al.

FOREIGN PATENT DOCUMENTS

CN      108216646 A      6/2018
DE   102005033884 A1 *  2/2007  ............... H02P 5/50
(Continued)

OTHER PUBLICATIONS

English Translation of the International Search Report mailed on Mar. 29, 2021, issued in corresponding International Application No. PCT/FR2020/052361, filed on Dec. 9, 2020, 3 pages.
(Continued)

*Primary Examiner* — Karen Masih
(74) *Attorney, Agent, or Firm* — Christensen O'Connor Johnson Kindness PLLC

(57) ABSTRACT

A system (11) for balancing at least one parameter to be balanced of an electric motor of a propulsion system (1), in particular of an aircraft, includes at least two electric motors (3, 4) and a propulsion member (2) driven in rotation by said electric motors. The balancing system is configured to calculate a correction of the speed setpoint (Corr_Cons_V1, Corr_Cons_V2) as a function of a correction factor (F1, F2) of the speed setpoint depending on a parameter (P1, P2) of the associated electric motor that is intended to be balanced and on a speed setpoint (Cons_VH) of the propulsion member (2).

13 Claims, 4 Drawing Sheets

(51) Int. Cl.
  *B64D 31/16*  (2024.01)
  *H02P 5/50*   (2016.01)
  *H02P 5/74*   (2006.01)

(56) References Cited

FOREIGN PATENT DOCUMENTS

| | | | |
|---|---|---|---|
| DE | 112015003310 T5 | 3/2017 | |
| DE | 102016220234 A1 | 4/2018 | |
| DE | 102017220941 A1 | 5/2019 | |
| FR | 3082504 A1 * | 12/2019 | ............. B64C 27/12 |
| JP | 2007174799 A * | 7/2007 | |

OTHER PUBLICATIONS

English Translation of the Written Opinion of the International Searching Authority mailed on Mar. 29, 2021, issued in corresponding International Application No. PCT/FR2020/052361, filed on Dec. 9, 2020, 3 pages.

* cited by examiner

SYSTEM AND METHOD FOR BALANCING AT LEAST ONE PARAMETER TO BE BALANCED OF AN ELECTRIC MOTOR OF A PROPULSION SYSTEM

CROSS-REFERENCES TO RELATED APPLICATIONS

This application is a National Stage of International Application No. PCT/FR2020/052361, filed Dec. 9, 2020, which claims priority to French Patent Application No. 1913963, filed Dec. 9, 2019, the entire disclosures of which are hereby incorporated by reference.

TECHNICAL FIELD OF THE INVENTION

The present invention relates to the field of aircraft propulsion systems, such as in particular electric or hybrid aircraft propulsion systems.

PRIOR ART

An electric or hybrid aircraft propulsion system comprises a propulsion member configured to enable and/or participate in the propulsion and/or lift of the aircraft and at least two electric motors configured to drive the rotation of the propulsion member. The propulsion member can be a propeller, for example faired or non-faired, a turbojet fan or more generally any propulsion member driven by at least two electric motors.

The number of electric motors for driving the propeller is often high in order to enable the rotation of the propeller and thus the propulsion and/or lift of the aircraft in the event of failure of one of the electric motors.

The electric motors can be disposed in series on the same drive shaft or by means of mechanical coupling or gear mesh systems and are, entirely or partially, kinematically linked in rotation to the propeller. The rotational speed of the electric motors is thus proportional to the rotational speed of the propeller in at least one operating mode.

Conventionally, each of the electric motors is controlled individually. Two control modes can be used to control said motors individually.

According to a first control mode, the speed of the propulsion member is controlled directly, jointly for all the electric motors. The motors are thus controlled according to a single speed control loop directly on the speed of the propeller. In this case, the so-called overall speed control of the propulsion member makes it possible to calculate a torque control setpoint for each electric motor. Each electric motor is thus controlled individually in terms of torque.

According to a second control mode, the motors can be controlled in terms of torque according to a specific torque control loop for each motor. Such a control mode makes it possible to ensure the safety of the aircraft in the event of malfunction of one of the electric motors.

The control systems of the motors according to the respective speed thereof comprise, for each of the electric motors, an autonomous control loop independent from the other motors. Thus, the propeller speed control is robust to the malfunction of one of the control loops and/or an electric motor. Moreover, in the event of uncoupling of the propeller, the electric motor speed control is maintained, which facilitates the recoupling of the propeller.

However, in such a decentralised speed control system, i.e. specific to each electric motor, a disparity in the power supplied by each motor is observed. This disparity in the power supplied is essentially due to the fact that the motors are not configured to balance naturally and can give rise to significant overheating of the electric motor supplying the highest power, and thus a degradation of the motor, or even a failure of said motor.

It is hence necessary to balance the power supplied by the electric motors driving the same rotary shaft of the propeller.

In order to balance the electric motors, it is known to establish communication between the electric motors. However, the number of connections required for such communication is proportional to the number of motors, which makes the propulsion system more complex. Furthermore, it is particularly difficult to handle failures of such communication.

Thus, there is a need to balance the electric motors of a propulsion system while enhancing the independence between the motors.

DESCRIPTION OF THE INVENTION

Therefore, the aim of the present invention is that of overcoming the drawbacks of the systems cited above and of proposing a system and a method for balancing the electric motors of an aircraft propulsion system without any communication between the different electric motors.

The invention therefore relates to a system for balancing at least one parameter to be balanced of an electric motor of a propulsion system, in particular of an aircraft, comprising at least two electric motors and a propulsion member or propeller driven in rotation by said electric motors.

It will be noted that it is preferable for the drive torque of the propulsion member to be monotonic with the rotational speed thereof, which is generally the case for propulsion members used in aircraft.

The balancing system comprises a balancing module associated with an electric motor, each of the balancing modules being configured to calculate a correction of the speed setpoint as a function of a correction factor of the speed setpoint dependent on a parameter of the associated electric motor that is intended to be balanced and on a speed setpoint of the propulsion member.

Thus, the balancing is hence specific to each motor and only uses one or more parameters of the controlled motor.

It will be noted that the invention is not limited to the number of motors described with reference to the figures and could be applied to N electric motors, N being an integer greater than two.

The correction factor of the speed setpoint is, for example, a decreasing monotonic affine function dependent on a balancing gain and a predetermined maximum setpoint correction value.

The balancing gain can be determined as a function of a maximum value of the static error on the speed of the propulsion member allocated to balancing the electric motors, for example predetermined as a function of a maximum rotational speed setpoint of the propulsion member, a minimum value of the static error on the speed of the propulsion member allocated to balancing the electric motors, for example predetermined as a function of a minimum rotational speed setpoint of the propulsion member, and maximum and minimum values of the parameter to be balanced.

The balancing gain is determined so as to reduce a static error between the parameters of the electric motors that are intended to be balanced, and accordingly on the speed of the propulsion member.

According to an embodiment, the balancing system comprises a module for compensating the static error on the speed of the propulsion member configured to calculate a compensation setpoint of the speed setpoint of the propulsion member as a function of the parameter to be balanced of the associated motor.

According to another embodiment, the balancing system comprises a module for compensating the static error on the speed of the propulsion member configured to calculate a compensation setpoint of the speed setpoint of the propulsion as a function of the estimated load value of the propulsion member.

The parameter to be balanced corresponds, for example, to the electric current in the associated electric motor.

The parameter P to be balanced corresponds to an essential physical quantity for the design of the electric motor and can be chosen from the list, which is non-exhaustive, comprising the torque delivered by the electric motor, the electric current in the electric motor, the electric current consumed by the power electronics of the electric motor, the mechanical power, the electric power at a point in the propulsion chain, the temperature measured, for example on the electric motor.

For example, the balancing system comprises a low-pass filter upstream from each balancing module in order to filter the parameter of the associated electric motor that it is intended to balance entering the balancing module.

According to a second aspect, the invention relates to a control system comprising a balancing system as described above and a control module associated with an electric motor and configured to calculate and send a torque command to the associated electric motor as a function of the rotational speed of the associated electric motor and the speed setpoint calculated by the balancing system.

Advantageously, the control system comprises two separate control units, each assigned to an electric motor, each of the control units comprising at least a balancing module and a control module.

According to another aspect, the invention relates to a propulsion system, in particular of an aircraft, comprising at least two electric motors mounted on the same rotary shaft, a propulsion member or propeller driven in rotation by said motors and a system for controlling the electric motors as described above.

According to another aspect, the invention relates to a method for balancing at least one parameter to be balanced of an electric motor of a propulsion system, in particular of an aircraft, comprising at least two electric motors and a propulsion member or propeller driven in rotation by said electric motors, comprising:

a step of calculating a correction factor of a speed setpoint dependent on a parameter of the associated electric motor that is intended to be balanced, and
 a step of calculating, for each of the electric motors, a correction of the speed setpoint as a function of the correction factor calculated and a speed setpoint of the propulsion member.

Advantageously, to calculate the correction factor of the speed setpoint, a balancing gain is calculated as a function of a maximum value of the static error on the speed of the propulsion member allocated to balancing the electric motors, for example predetermined as a function of a maximum rotational speed setpoint of the propulsion member, a minimum value of the static error on the speed of the propulsion member allocated to balancing the electric motors, for example predetermined as a function of a minimum rotational speed setpoint of the propulsion member, and maximum and minimum values of the parameter to be balanced.

According to an embodiment, a compensation setpoint of the speed setpoint of the propulsion member is calculated as a function of the parameter to be balanced of the associated motor or as a function of an estimated load value of the propulsion member.

According to another aspect, the invention relates to a control method wherein the speed setpoint calculated in the calculating step of the balancing method as described above is sent to a control module associated with an electric motor, and a torque command is calculated as a function of the rotational speed of the associated electric motor and said speed setpoint.

Thus, the control method is configured to modulate a speed setpoint of each of the motors as a function of the speed setpoint correction factor calculated by the balancing method.

BRIEF DESCRIPTION OF THE DRAWINGS

Further aims, features and advantages of the invention will emerge on reading the following description, given merely by way of non-limiting example, with reference to the indexed drawings wherein.

DETAILED DESCRIPTION OF AT LEAST ONE EMBODIMENT

Figure 1:
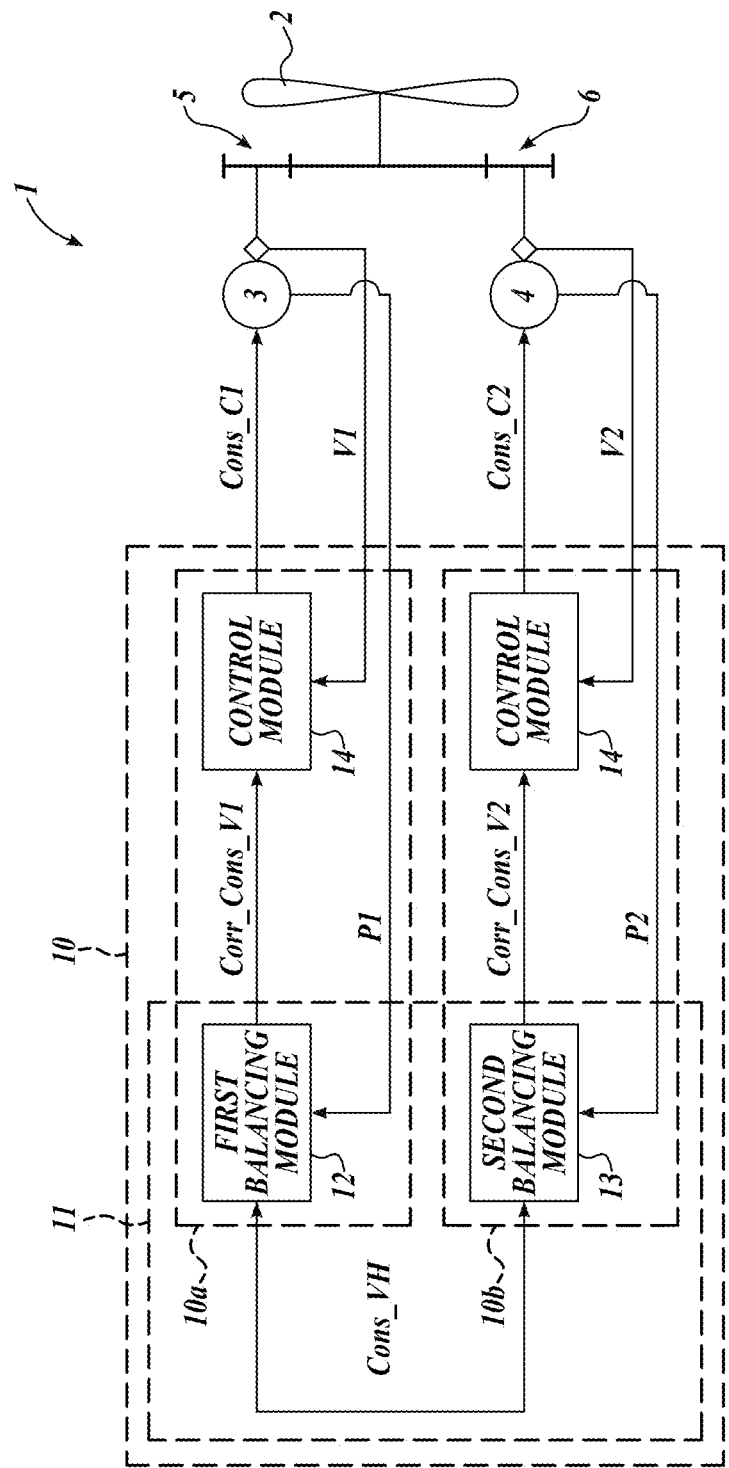
FIG. 1 schematically illustrates an aircraft propulsion system comprising two electric motors and a system for controlling said motors including a system for balancing a parameter of said motors according to a first embodiment of the invention.

In FIG. 1, an aircraft propulsion system 1 comprising a propeller 2 to enable and/or participate in the propulsion and/or lift of the aircraft and two electric motors 3, 4 configured to drive the rotation of the propeller 2 by means of coupling and/or gear mesh devices 5, 6 is represented very schematically. It will be noted that the invention is not limited to the number of motors described with reference to the figures and could be applied to N electric motors, N being an integer greater than two.

Moreover, the invention is not limited to the presence of coupling and/or gear mesh devices. The electric motors 3, 4 could be disposed directly on the shaft of the propeller 2.

It will also be noted that the motors 3, 4 can be separate items of equipment, each composed of a stator and a rotor, a single motor member, composed of several polyphase stator windings and a common rotor, or any combination of the above elements.

The propulsion system 1 further comprises a control system configured to calculate and send a torque command Cons_C1, Cons_C2 to each of the electric motors 3, 4.

The control system 10 comprises two separate control units 10a, 10b, each assigned to an electric motor 3, 4. Each control unit hosts the balancing and control functions of the associated motor. The control electronics can also form part of the electric motor per se. Such motors are referred to as "intelligent".

Alternatively, a single electric control unit could be provided for the two electric motors.

The control system 10 is configured to modify the torque command of each electric motor 3, 4 as a function of a parameter P of the associated electric motor that is intended to be balanced, for example as a function of the power delivered by the corresponding motor.

The control system 10 comprises for this purpose a balancing system 11 configured to calculate a correction of the speed setpoint Corr_Cons_V1, Corr_Cons_V2 of the associated electric motor 3, 4 as a function of a correction factor F1, F2 of the speed setpoint dependent on a parameter P of the associated electric motor that is intended to be balanced. The balancing is hence specific to each motor and only uses one or more parameters of the controlled motor.

The parameter P to be balanced corresponds to an essential physical quantity for the design of the electric motor and can be chosen from the list, which is non-exhaustive, comprising the torque delivered by the electric motor, the electric current in the electric motor, the electric current consumed by the power electronics of the electric motor, the mechanical power, the electric power at a point in the kinematic chain, the temperature measured, for example on the electric motor.

In all of the examples illustrated and described, the parameter P to be balanced corresponds to the electric current in the electric motor. Indeed, the electric current corresponds to the essential parameter for the design of the electric motor and particularly of the power electronics thereof. Balancing the electric current in the electric motor makes it possible to optimise the design of the electric motor and reduce the temperature thereof. It will be noted that the invention is not limited to the use of the electric current in the motor as the parameter to be balanced and could be applied to any parameter to be balanced as defined above.

As illustrated, the balancing system 11 comprises a first balancing module 12 associated with the first electric motor 3 and a second balancing module 13 associated with the second electric motor 4.

The first balancing module 12 is configured to calculate a correction of the speed setpoint Corr_Cons_V1 as a function of a speed setpoint of the propeller Cons_VH and a first correction factor F1. The first correction factor F1 is dependent on the parameter P1 to be balanced, here the electric current in the first electric motor 3. The speed setpoint Corr_Cons_V1 is then sent to a control module 14 of the speed V1 of the first electric motor 3 configured to calculate a torque setpoint Cons_C1 as a function of the rotational speed V1 of the first electric motor 3 and the speed setpoint Corr_Cons_V1 calculated by the balancing module 12.

Similarly, the second balancing module 13 is configured to calculate a correction of the speed setpoint Corr_Cons_V2 as a function of a speed setpoint of the propeller Cons_VH and a second correction factor F2. The second correction factor F2 is dependent on the parameter P2 to be balanced, here the electric current in the second electric motor 4. The speed setpoint Corr_Cons_V2 is then sent to a control module 15 of the speed V2 of the first electric motor 4 configured to calculate a torque command Cons_C2 as a function of the rotational speed V2 of said second motor 4 and the speed setpoint Corr_Cons_V2 calculated by the balancing module 13.

In the case of a propulsion system 1 comprising N electric motors, each of the balancing modules of the associated electric motor is configured to calculate a correction of the speed setpoint Corr_Cons_VN according to the following equation:

$$Corr\_Cons\_VN = Cons\_VH + F$$

Where:

FN is a decreasing monotonic affine function, expressed according to the following equation:

$$FN = Corr\_Cons\_Vmax + GN \cdot PN$$

Where:

GN is a balancing gain for each electric motor; and

Corr_Cons_Vmax is a predetermined maximum setpoint correction value, corresponding to the maximum static error on the speed setpoint of the propeller that is authorised to be generated to balance the motors.

The balancing gain GN is determined in such a way as to reduce a static error E on the speed of the propeller 2. This static error E is proportional to the parameter of the motor to be balanced, here the electric current.

The balancing gain GN is expressed according to the following equation:

$$GN = \frac{E\max - E\min}{PN(\max) - PN(\min)}$$

Where:

Emax is the maximum value of the static error on the speed of the propeller allocated to balancing the electric motors, predetermined as a function of a maximum rotational speed setpoint of the propeller; said static error is imposed by the aircraft flight control system on the propulsion system, it is dependent on the precision required by the piloting system to ensure flight control that is stable, comfortable for the pilot and effective;

Emin is the minimum value of the static error on the speed of the propeller allocated to balancing the electric motors, predetermined as a function of a minimum rotational speed setpoint of the propeller; similarly to the maximum static error, said minimum static error is imposed by the aircraft flight control system on the propulsion system;

PN(max) is the maximum value of the parameter to be balanced, here the maximum value of the current permissible by the electric motor N; and PN(min) is the minimum value of the parameter to be balanced, here the minimum value of the electric current of the electric motor N.

An excessive balancing gain GN results in degrading of the speed control stability margins of the motor N, potentially causing the electric motors to oscillate. It is therefore important to determine a balancing gain in order to obtain a compromise between the quality of the balancing of the electric motors, the static error induced on the speed of the propeller and the stability robustness of the overall motor control.

To remedy this drawback, the control system 10 can comprise a low-pass filter upstream from each balancing module in order to filter the parameter P to be balanced, here the electric current, of the motor entering the balancing module.

The first electronic control unit 10a comprises the first balancing module 12 and the first control module 14.

The second electronic control unit 10b comprises the second balancing module 13 and the second control module 15.

Thus, the control system comprises two separate control units assigned to an electric motor.

Figure 2:
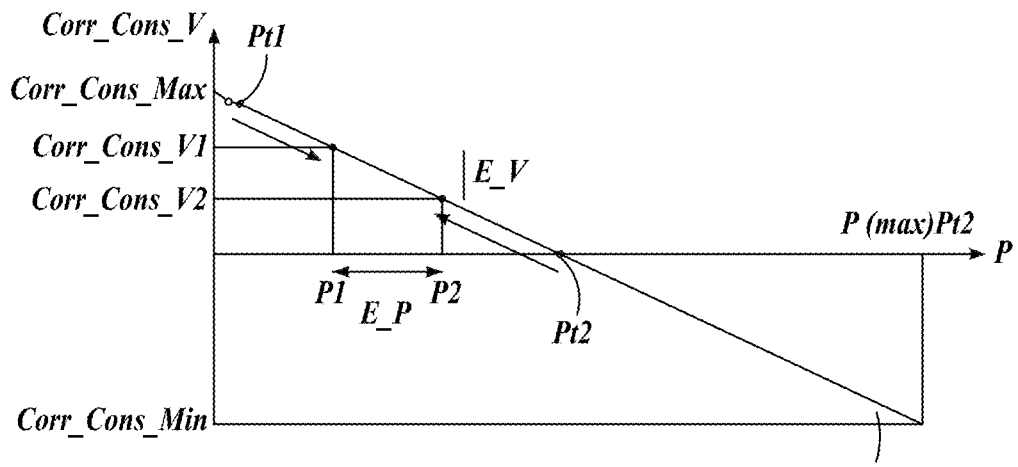
FIG. 2 is a graph illustrating the rotational speed setpoint correction of the motors of the propulsion system on the y-axis as a function of a parameter of said propulsion system on the x-axis.

FIG. 2 represents a graph illustrating the rotational speed setpoint correction of the electric motors 3, 4 of the propulsion system 1 on the y-axis as a function of the parameter P1, P2 to be balanced of each motor 3, 4 on the x-axis.

The line D1 corresponds to the balancing line corresponding to the correction of the speed setpoint applied on each electric motor as a function of the parameter P to be balanced, here the electric current in the motor.

In this graph, an example of the trend of the working points of the electric motors balanced according to the first embodiment described above is represented, in order to display the interaction between the balancing function, the parameter to be balanced and the correction of the speed setpoint. The working points Pt1 and Pt2 correspond to the initial working points of the first and second electric motors 3, 4, respectively.

In the example illustrated, the first electric motor 3 initially has a low current, while the second electric motor 4 initially has a higher current than the current of the first motor.

The balancing module 12 associated with the first motor 3 is configured to correct the speed setpoint of said motor so as to increase the electric current thereof.

Conversely, the balancing module 13 associated with the second motor 4 is configured to correct the speed setpoint of said motor so as to reduce the electric current thereof.

Thus, the balancing system 11 is configured to move the working points of the electric motors closer to one another. The residual current deviation E_P between the electric motors is proportional to the speed measurement error E_V between said motors.

The current deviation is thus substantially reduced, without for all that being cancelled.

Figure 3:
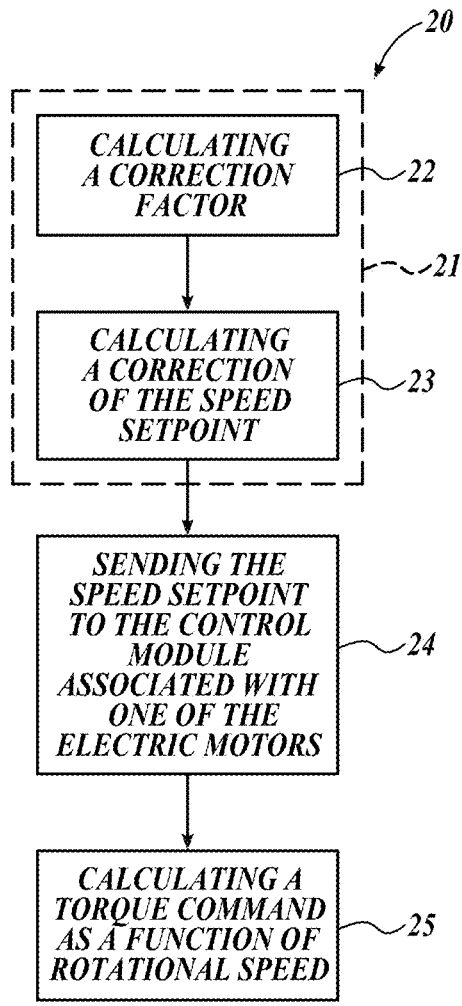
FIG. 3 represents a method for controlling the electric motors of the propulsion system in FIG. 1 comprising a method for balancing a parameter of said motors implemented in the balancing system in FIG. 1.

The flow chart represented in FIG. 3 illustrates an example of a method 20 for controlling electric motors 3, 4 comprising a method 21 for balancing a parameter of said motors implemented in the balancing system in FIG. 1.

The balancing method 21 comprises a step 22 of calculating a correction factor F1, F2 of a speed setpoint dependent on a parameter P1, P2 of the associated electric motor that is intended to be balanced, and a step 23 of calculating, for each of the electric motors 3, 4, a correction of the speed setpoint Corr_Cons_V1, Corr_Cons_V2 as a function of a correction factor and a speed setpoint Cons_VH of the propeller 2 according to the equations Math 1 to Math 3 above.

The control method 20 further comprises a step 24 of sending the control module 14, 15 associated with one of the electric motors 3, 4 the speed setpoint Corr_Cons_V1, Corr_Cons_V2 calculated in the step 23 of calculating the balancing method 21 and a step 25 of calculating a torque command Cons_C1, Cons_C2, or directly the duty cycle commands PWM of the motors, as a function of the rotational speed V1, V2 of the associated electric motor 3, 4 and said speed setpoint Corr_Cons_V1, Corr_Cons_V2.

Figure 4:
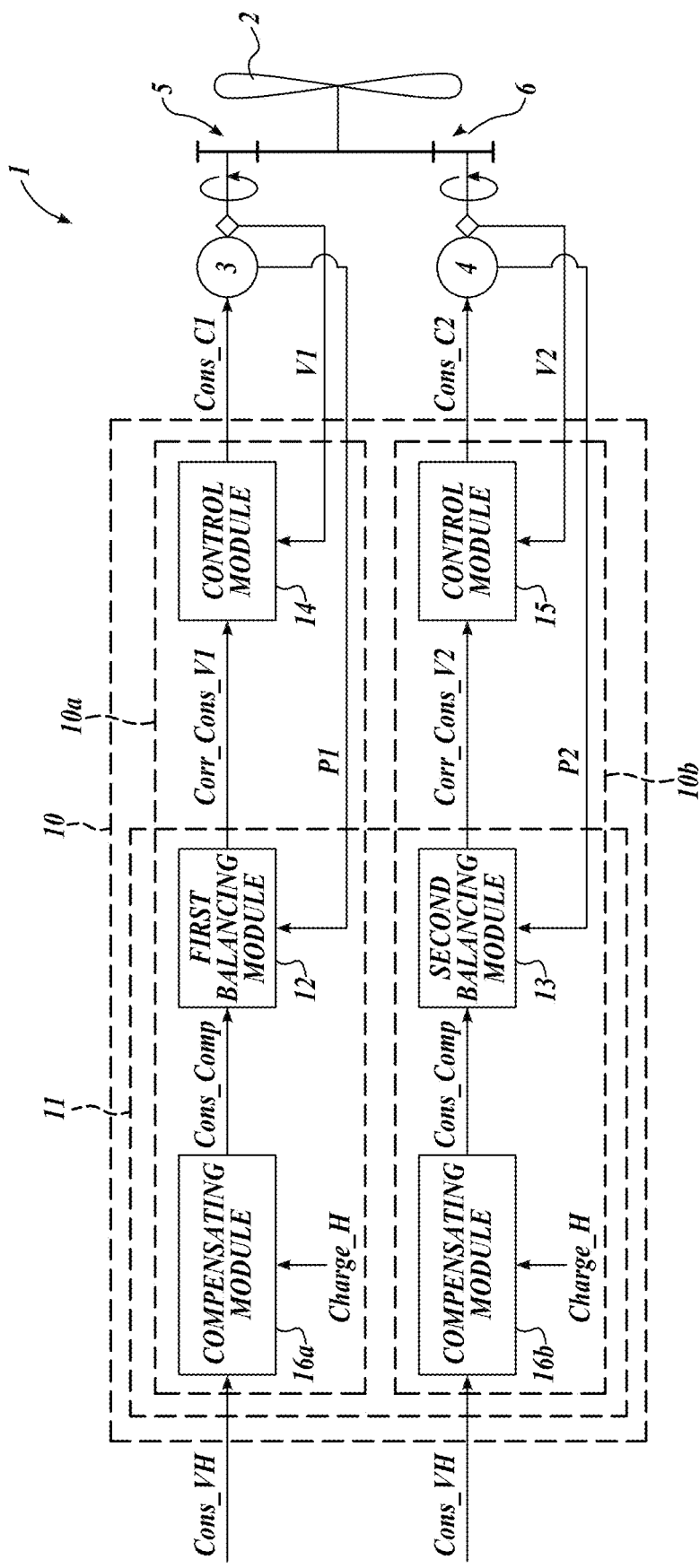
FIG. 4 schematically illustrates an aircraft propulsion system comprising two electric motors and a system for controlling said motors including a system for balancing a parameter of said motors according to a second embodiment of the invention.

The embodiment illustrated in FIG. 4, wherein the same elements bear the same references, differs from the embodiment illustrated in FIG. 1 by the integration of a module 16a, 16b for compensating the static error in each of the control units 10a, 10b.

Each of the modules 16a, 16b for compensating the static error is configured to calculate a compensation setpoint Cons_comp of the setpoint of the propeller 2 as a function of an estimated value Charge_H of the load of the propeller 2.

The estimated value Charge_H of the load of the propeller 2 is known from the propeller manufacturer, particularly using maps as a function of the pitch of the propeller and the rotational speed of the propeller.

The compensation setpoint Cons_comp of the setpoint of the propeller 2 is then sent to the input of each of the balancing modules 12, 13 of the balancing system 11.

Each of the modules 16a, 16b makes it possible to partially compensate, in an open loop, the static error on the speed of the propeller.

However, the estimation of the load of the propeller is not a definite value.

Figure 5:
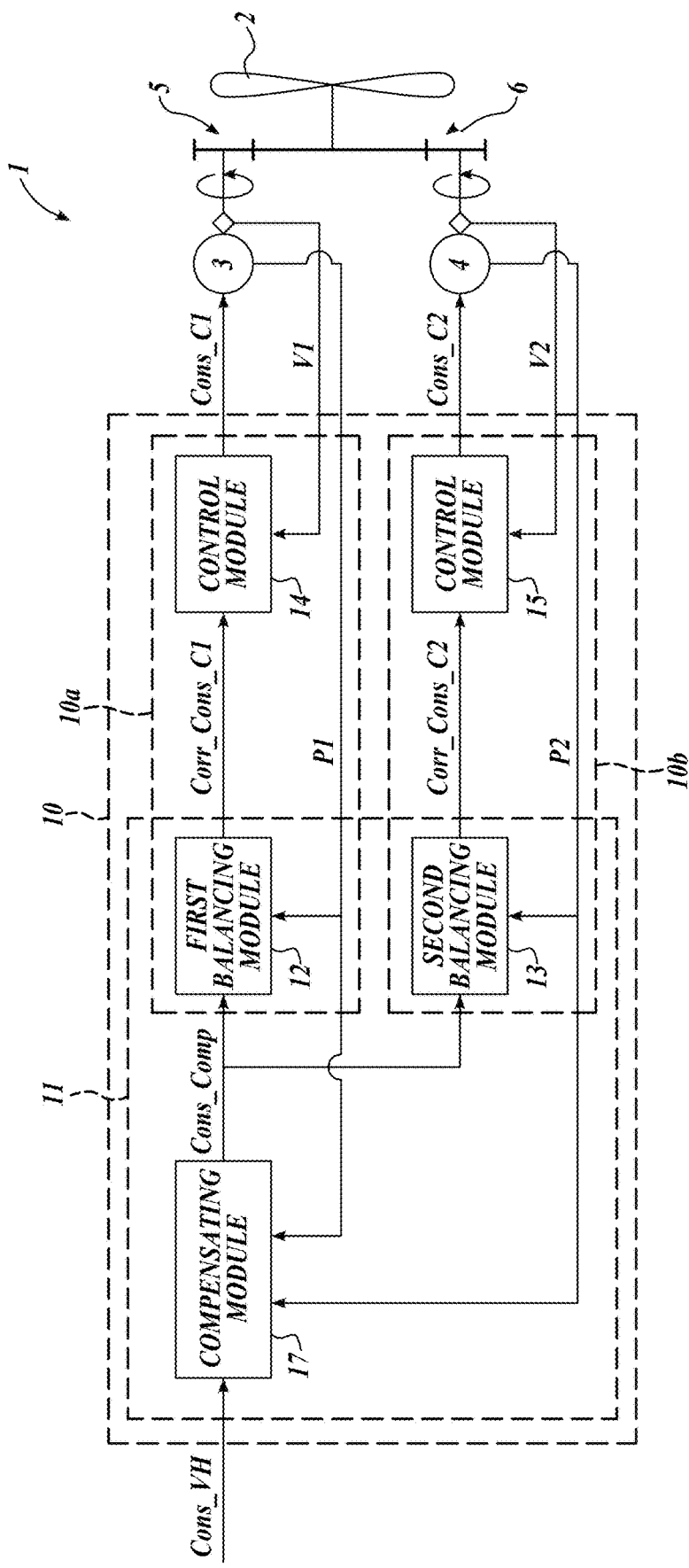
FIG. 5 schematically illustrates an aircraft propulsion system comprising two electric motors and a system for controlling said motors including a system for balancing a parameter of said motors according to a third embodiment of the invention.

The embodiment illustrated in FIG. 5, wherein the same elements bear the same references, differs from the embodiment illustrated in FIG. 1 by the integration of a module 17 for compensating the static error in the control system 10, upstream from the electronic control units 10a, 10b allocated to each of the electric motors. For example, the module 17 for compensating the static error can be integrated in a control unit configured to calculate the speed setpoint of the propeller Cons_VH.

The module 17 for compensating the static error is configured to calculate a compensation setpoint Cons_comp of the setpoint of the propeller 2 as a function of the parameter P to be balanced, here the electric current.

The compensation setpoint Cons_comp of the setpoint of the propeller 2 is then sent to the input of each of the balancing modules 12, 13 of the balancing system 11.

The module 17 makes it possible to fully compensate, in a closed loop, the static error on the speed of the propeller, with no communication between the electric motors.

The modules 16 and 17 of the second and third embodiments of the invention make it possible to apply an inverse adjustment of the speed setpoint of that applied by the balancing modules.

Thanks to the invention, the electric motors do not communicate with each other, but communicate with the assigned electronic control unit 10a, 10b. This communication is already present on aircraft propulsion systems, such that the proposed solution does not make the propulsion system more complex.

The invention could be applied to any propulsion system comprising a propulsion member and at least two electric motors mounted on the same rotary shaft of the propulsion member.

The term "propeller" more specifically used in the detailed description of the figures encompasses, as a general rule, any propulsion member driven by at least two electric motors. In other words, the propulsion member can be a propeller, for example of the faired or non-faired propeller type or a turbojet fan.

The invention claimed is:

1. A balancing system for balancing an electric motor of a propulsion system with at least one parameter, the propulsion system comprising at least two electric motors and a propulsion member driven in rotation by said electric motors, the balancing system comprising a balancing module associated with each electric motor, each of the balancing modules being configured to calculate a correction of a speed setpoint of the associated electric motor as a function of a correction factor of the speed setpoint dependent on said at least one parameter of the associated electric motor that is intended to be balanced and a speed setpoint of the propulsion member, wherein the correction factor of the speed setpoint is a decreasing monotonic affine function dependent on a balancing gain and a predetermined maximum speed setpoint correction value.

2. The balancing system according to claim 1, wherein the balancing gain is determined as a function of a maximum value of a static error on value of the static error on the speed of the propulsion member allocated to balancing the two electric motors, and maximum and minimum values of the parameter to be balanced.

3. The balancing system according to claim 2, further comprising a compensating module for compensating the static error on the speed of the propulsion member, the compensating module being configured to calculate a compensation setpoint of the speed setpoint of the propulsion member as a function of an estimated value of a load of the propulsion member.

4. The balancing system according to claim 2, further comprising a compensating module for compensating the static error on the speed of the propulsion member, the compensating module being configured to calculate a compensation setpoint of the speed setpoint of the propulsion member as a function of the parameter to be balanced of the associated motor.

5. The balancing system according to claim 1, wherein the parameter to be balanced corresponds to an electric current in the associated electric motor.

6. The balancing system according to claim 1, further comprising a low-pass filter upstream from each balancing module, each low-pass filter being configured to filter the parameter of the associated electric motor.

7. A control system comprising a balancing system according to claim 1 and a first control module associated with a first electric motor and configured to calculate and send a torque command to the associated electric motor as a function of a rotational speed of the associated electric motor and the speed setpoint calculated by the balancing system.

8. The control system according to claim 7, further comprising a second control unit associated with a second electric motor, wherein the second control unit comprises a balancing system and a second control module, the balancing system comprising a balancing module associated with each electric motor, each of the balancing modules being configured to calculate a correction of a speed setpoint of the associated electric motor as a function of a correction factor of the speed setpoint dependent on said at least one parameter of the associated electric motor that is intended to be balanced and a speed setpoint of the propulsion member, wherein the correction factor of the speed setpoint is a decreasing monotonic affine function dependent on a balancing gain and a predetermined maximum speed setpoint correction value.

9. A propulsion system, comprising at least two electric motors mounted on a same rotary shaft, a propulsion member driven in rotation by said two electric motors and a control system for controlling the electric motors according to claim 7.

10. A method for balancing an electric motor of a propulsion system with at least one parameter to be balanced comprising at least two electric motors and a propulsion member driven in rotation by said electric motors, the method comprising:
calculating a correction factor of a speed setpoint dependent on a parameter of an associated one of the two electric motors that is intended to be balanced; and
calculating, for each of the two electric motors, a correction of a speed setpoint as a function of the correction factor calculated and a speed setpoint of the propulsion member, wherein the correction factor of the speed setpoint is a decreasing monotonic affine function dependent on a balancing gain and a predetermined maximum speed setpoint correction value.

11. The method according to claim 10, wherein to calculate the correction factor of the speed setpoint, a balancing gain (GN) is calculated as a function of a maximum value of a static error on the speed of the propulsion member allocated to balancing the two electric motors, a minimum value of the static error on the speed of the propulsion member allocated to balancing the two electric motors, and maximum and minimum values of the parameter to be balanced.

12. The method according to claim 10, wherein a compensation setpoint of the speed setpoint of the propulsion member is calculated as a function of the parameter to be balanced of the associated motor or as a function of an estimated value of the load of the propulsion member.

13. A control method, comprising:
calculating, for each of first and second electric motors, a correction of a speed setpoint as a function of a correction factor and a speed setpoint of a propulsion member, wherein the correction factor of the speed setpoint is a decreasing monotonic affine function dependent on a balancing gain and a predetermined maximum speed setpoint correction value;
receiving, by a control module associated with an electric motor, the calculated speed setpoint; and
calculating a torque command as a function of a rotational speed of the associated electric motor and said calculated speed setpoint.

* * * * *